United States Patent [19]

Suzuki

[11] Patent Number: 5,553,246

[45] Date of Patent: Sep. 3, 1996

[54] SHARED BUS MEDIATION SYSTEM FOR MULTIPROCESSOR SYSTEM

[75] Inventor: Hiromi Suzuki, Tokyo, Japan

[73] Assignee: NEC Corporation, Tokyo, Japan

[21] Appl. No.: 144,352

[22] Filed: Nov. 1, 1993

[30] Foreign Application Priority Data

Oct. 30, 1992 [JP] Japan ................................. 4-292835

[51] Int. Cl.⁶ .................................................. G06F 13/00
[52] U.S. Cl. ........................ 395/287; 395/477; 395/311; 364/DIG. 1; 364/229; 364/229.2; 364/240; 364/240.7
[58] Field of Search ................................... 395/725, 325, 395/550, 425, 287, 477, 311, 306, 312, 728; 364/134

[56] References Cited

U.S. PATENT DOCUMENTS

| | | | |
|---|---|---|---|
| 3,896,418 | 7/1975 | Brown | 395/477 |
| 4,410,944 | 10/1983 | Kronies | 364/134 |
| 4,455,620 | 6/1984 | Watanabe et al. | 395/477 |
| 4,549,273 | 10/1985 | Tin | 395/477 |
| 4,621,318 | 11/1986 | Maeda | 364/134 |
| 4,622,630 | 11/1986 | Vora et al. | 364/134 |
| 4,706,002 | 11/1987 | Fukuyama | 364/134 |
| 4,725,944 | 2/1988 | Koenig | 395/550 |
| 4,764,865 | 8/1988 | Temple, III | 395/477 |
| 4,803,618 | 2/1989 | Ita et al. | 364/134 |
| 4,807,184 | 2/1989 | Shelor | 364/134 |
| 4,807,259 | 2/1989 | Yamanaka et al. | 375/109 |
| 4,947,478 | 8/1990 | Maeno | 395/325 |
| 5,129,090 | 7/1992 | Bland et al. | 355/725 |
| 5,202,973 | 4/1993 | Ramanujan et al. | 395/474 |
| 5,423,008 | 6/1995 | Young et al. | 395/287 |

FOREIGN PATENT DOCUMENTS

| | | | |
|---|---|---|---|
| 0147656 | 7/1985 | European Pat. Off. | 364/134 |
| 57-145156 | 2/1984 | Japan | 364/134 |
| 59-125316 | 1/1986 | Japan | 364/134 |

*Primary Examiner*—Ayaz R. Sheikh
*Attorney, Agent, or Firm*—Foley & Lardner

[57] ABSTRACT

A shared bus control system for multiprocessor system having shared buses for a plurality of processors comprises a bus mediation circuit which outputs the switch control signal to switch accessing to the shared buses by the plurality of processors with synchronizing the system clock and a bus selection circuit which selects the address and data from one processor according to the switch control signal and outputs them to the shared buses. It further comprises a state detection circuit which decodes the bus status signal from the particular processor among the processors and detects the bus state of the particular processor and a clock modulation circuit to modulate the operation clock for the particular processor when the state detection circuit detects the particular bus states.

8 Claims, 3 Drawing Sheets

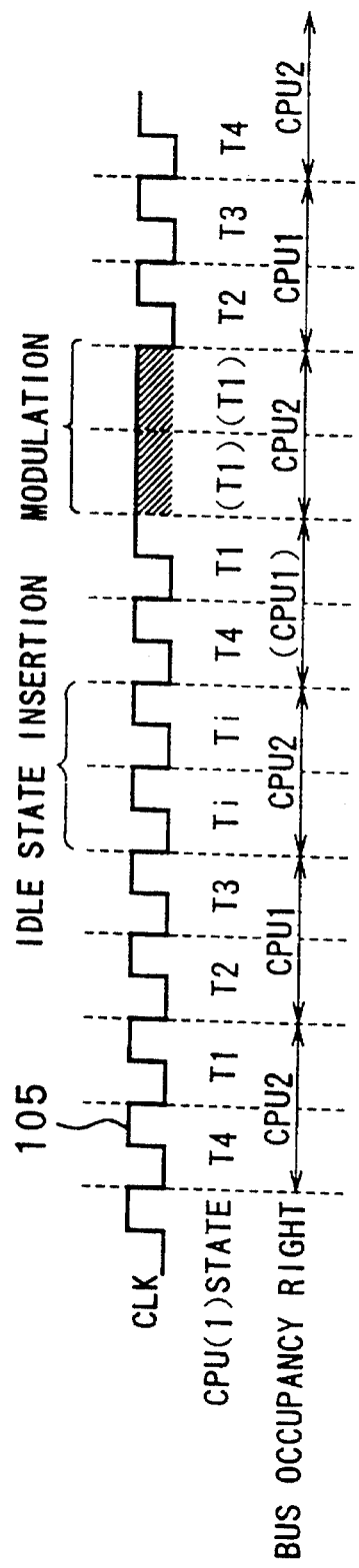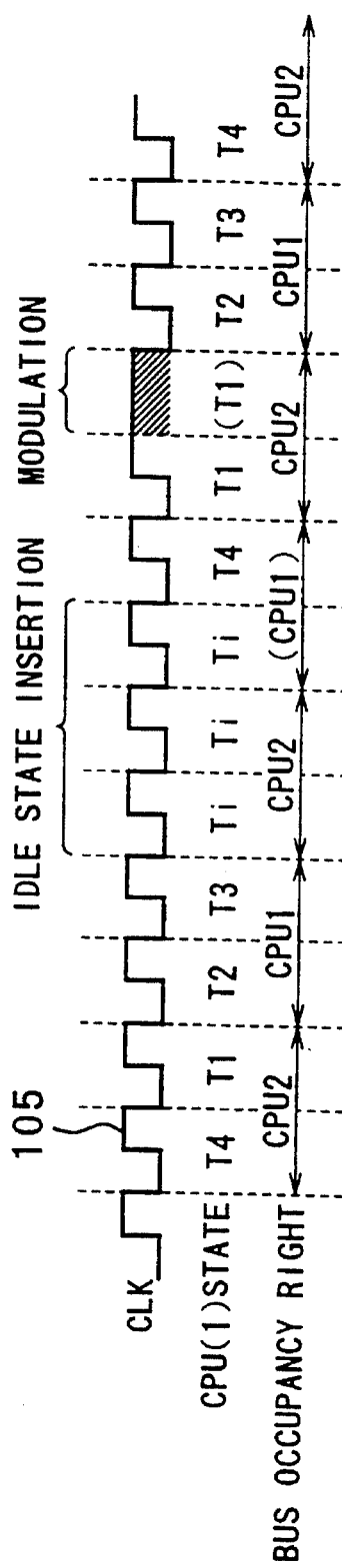

SHARED BUS MEDIATION SYSTEM FOR MULTIPROCESSOR SYSTEM

BACKGROUNDS OF THE INVENTION

1. Field of the Invention

The present invention relates to a multiprocessor system provided with shared buses for a plurality of processors, and particularly relates to a shared bus control system for effective utilization of the shared buses.

2. Description of the Related Art

Conventionally, a shared bus in a multiprocessor system has been controlled with setting a priority level for the shared buses at each of the processors. For contention of bus access between two processors, for example, the processor with the lower priority is forcibly held so that the processor with the higher priority occupies the shared buses.

Thus, conventional shared bus control for a multiprocessor system holds the processor with the lower priority and allows the one with the higher priority alone to use the shared processor upon bus contention. This means that the processor with the lower priority requires transition time to enter HOLD status and to return from HOLD status. In the case of μPD70108 from NEC Corporation, for example, the HOLD ACK is returned at least two states after HOLD request sampling for setting of HOLD status. This period for transition is lost time where no operation can be made for the processor set to HOLD status.

In addition, since status transition time is variable, it is difficult to pass the bus occupation right to the processor which wants to access the memory via the shared bus always at fixed intervals.

SUMMARY OF THE INVENTION

It is an object of the present invention to provide a shared bus control system for multiprocessor system which solves drawbacks in conventional systems as described above and reduces contention for a bus by a plurality of processors and thereby eliminates the need of HOLD status of other processors for use of the shared buses by a particular processor.

According to a preferred embodiment of the present invention to attain the above object, a shared bus control system for multiprocessor system having shared buses for a plurality of processors comprises a bus mediation means which synchronizes with the predetermined system clock to output the switch control signal to switch accessing to the shared buses among the plurality of processors, a bus selection means which receives addresses and data from the plurality of processors and selects the address and data output from one processor to output them to the shared buses according to the switch control signal from the bus mediation means, a state detection means which decodes the bus status signal from a particular processor among the processors to detect the bus state of the particular processor and a clock modulation means which modulates the operation clock for the particular processor according to the control signal output from the state detection means when particular bus states are detected.

According to a still preferred embodiment, the state detection means detects shifting of the bus cycle timing at the particular processor according to the bus state signal from the particular processor and the clock modulation means corrects the bus cycle timing by modulating the operation clock of the particular processor.

According to a further preferred embodiment, the state detection means receives the switch control signal output from the bus mediation means as the sampling signal and receives the bus status signal synchronizing with the sampling signal to determine the bus state of the particular processor.

According to a still another embodiment, the shared buses comprise an address bus and a data bus, and the bus selection means comprises an address bus selection means which receives addresses output from the processors, selects the address from one processor according to the switch control signal from the bus mediation means and outputs it to the shared address bus, and a data bus selection means which receives data output from the processors, selects the data output from one processor according to the switch control signal from the bus mediation means and outputs it to the shared data bus.

According to a further preferred embodiment, the plurality of processors access the shared buses with the bus cycle comprising four states (four clocks) including state T1 for start of bus cycle, state T2 for address determination, state T3 for data fetching and state T4 for bus cycle completion and the bus mediation means outputs the switch control signal to the bus selection means for every two clocks so that the particular processor occupies the shared buses when the state of the one processor is state T2 for address determination or state T3 for data fetching.

According to a still preferred embodiment, the state detection means receives the switch control signal output from the bus mediation means as the sampling signal and receives the bus status signal with synchronizing with the sampling signal so as to detect the bus state of the particular processor.

According to a further preferred embodiment, when insertion of idle state Ti into the bus cycle of the particular processor results in detection of state T1, T4 or idle state Ti by the state detection means at the timing where the shared buses are occupied by the particular processor, the clock modulation means enables access to the shared buses by the particular processor at the time when the occupation of the shared buses by the other processor is released next time by delaying the clock corresponding to the state following the detected state of the particular processor for the predetermined number of clocks.

According to a still another preferred embodiment to attain the above object, a shared bus control system for multiprocessor system having shared buses for a plurality of processors comprises a bus mediation means which synchronizes with the predetermined system clock to output the switch control signal to switch accessing to the shared buses among the plurality of processors, a bus selection means which receives addresses and data from the plurality of processors and selects the address and data output from one processor to output them to the shared buses according to the switch control signal from the bus mediation means, a state detection means which receives the switch control signal output from the bus mediation means as the sampling signal and receives the bus status signal synchronizing with the sampling signal to determine the bus state of the particular processor and a clock modulation means which modulates the operation clock for the particular processor according to the control signal output from the state detection means when particular bus states are detected, and the plurality of processors access the shared buses with the bus cycle comprising four states (four clocks) including state T1 for start of bus cycle, state T2 for address determination, state T3 for data fetching and state T4 for bus cycle completion and the bus mediation means outputs the switch control signal to the bus selection means for every two clocks so that the particular processor occupies the shared buses when the state of the one processor is state T2 for address determination or state T3 for data fetching, and when insertion of idle state Ti into the bus cycle of the particular processor results in detection of state T1, T4 or idle state Ti by the state detection means at the timing where the shared buses are occupied by the particular processor, the clock modulation means enables access to the shared buses by the particular processor at the time when the occupation of the shared buses by the other processor is released next time by delaying the clock corresponding to the state following the detected state of the particular processor for the predetermined number of clocks.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 4 is a timing chart to show the operation when two idle states are inserted to the bus cycle; and FIG. 5 is a timing chart to show the operation when three idle states are inserted to the bus cycle.

DESCRIPTION OF THE PREFERRED EMBODIMENT

Figure 1:
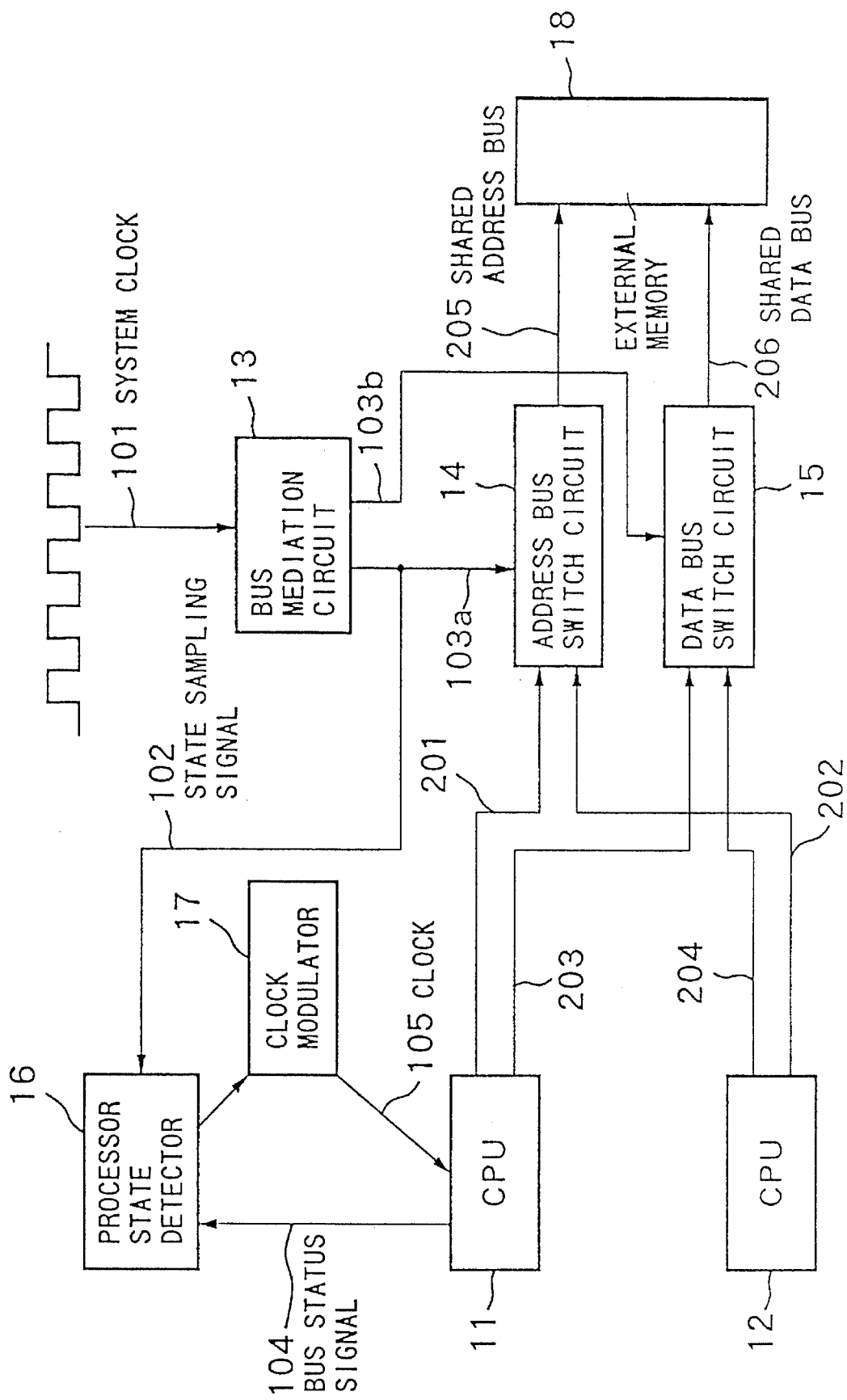
FIG. 1 is a block diagram to show the shared bus control system in a multiprocessor system according to a preferred embodiment of the present invention.

Referring to FIGS. 1 to 5, preferred embodiments of the present invention will be described below. FIG. 1 is a block diagram to show a preferred embodiment of a shared bus control system for a multiprocessor system.

The system comprises a CPU 11, called a first processor, a CPU 12, called a second processor, a bus mediation circuit 13 to output bus switch control signals 103a and 103b synchronizing with the system clock 101, an address bus switch circuit 14, a data bus switch circuit 15, a processor state detector 16, a clock modulator 17 to modulate the operation clock of the CPU 11 and an external memory 18 where the CPUs 11 and 12 access.

The address bus 201 of the CPU 11 and the address bus 202 of the CPU 12 are connected to the address bus switch circuit 14 and the data bus 203 of the CPU 11 and the data bus 204 of the CPU 12 are connected to the data bus switch circuit 15. The address bus switch circuit 14 is connected to the external memory 18 via the shared address bus 205 which is shared by the CPU 11 and the CPU 12 and the data bus switch circuit 15 is connected to the external memory 18 via the shared data bus 206 which is shared by the CPU 11 and the CPU 12.

The bus mediation circuit 13 divides the system clock 101 by two clocks and outputs the bus switch control signals 103a and 103b to the address bus switch circuit 14 and the data bus switch circuit 15. The bus switch control signal 103a is also sent to the processor state detector 16 as a status sampling signal 102.

Based on the bus switch control signal 103a from the bus mediation circuit 13, the address bus switch circuit 14 selects one of the address buses 201 and 202 for connection to the shared address bus 205. Based on the bus switch control signal 103b from the bus mediation circuit 13, the data bus switch circuit 15 selects one of the data buses 203 and 204 for connection to the shared data bus 206. The address bus switch circuit 14 and the data bus switch circuit 15 also serve as buffers to store addresses and data respectively.

The processor state detector 16 receives the bus switch control signal 103a output from the bus mediation circuit 13 as the state sampling signal 102. Synchronizing with the state sampling signal 102, it also receives the bus status signal 104 from the CPU 11 for decoding to detect the bus state of the CPU 11.

Figure 2:
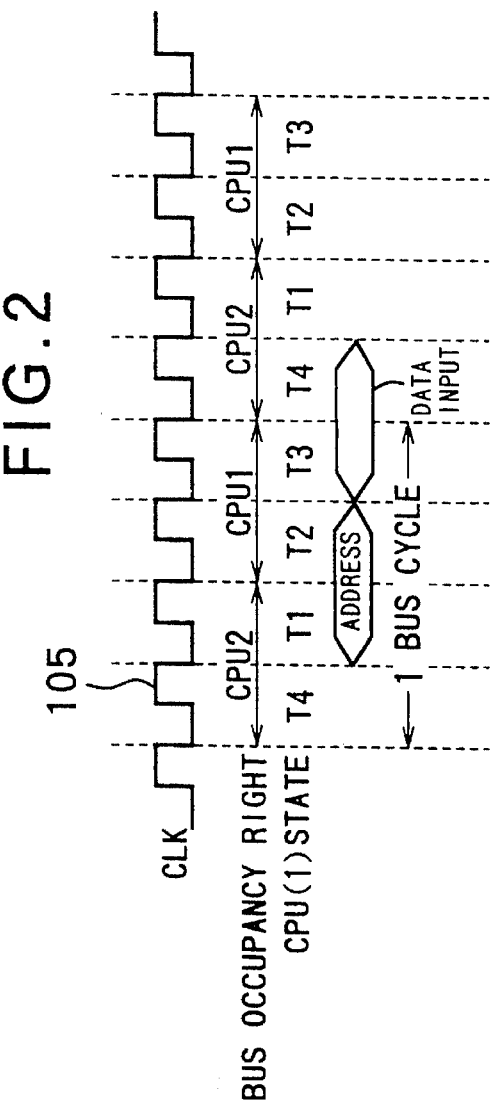
FIG. 2 is a timing chart to show the basic operation of the shared bus control system according to the above embodiment.

FIG. 2 is a basic timing chart showing the operation clock signal of the CPU 11, the bus occupancy rights of the shared address buses 205 and 206 and the state of the CPU 11.

In the system, access (for read or write operation) to the external memory 18 or to other I/O is always made in one bus cycle. One bus cycle basically comprises four states from T1 to T4 (four clocks) here. State T1 is for the start of a bus cycle, state T2 is for address determination, state T3 is for data fetching, and state T4 is for the end of a bus cycle. In other words, for operation of the CPU 11 or 12, access to the external memory via the shared bus, or the procedure from address determination to data fetching is made at states T2 to T3 in a bus cycle. In the states T4 and T1 of a bus cycle, the shared bus is not accessed.

In this embodiment, the CPUs 11 and 12 share the external memory 18 and the shared address buses 205 and 206. To prevent bus contention by the CPUs 11 and 12, either of the address bus 201 of the CPU 11 and the address bus 202 of the CPU 12 is selected by switching at the address bus switch circuit 14. This causes the address on the address bus 201 or 202 selected by the address bus switch circuit 14 to be output to the external memory 18 via the shared address bus 205.

Similarly, either of the data bus 203 of the CPU 11 and the data bus 204 of the CPU 12 is selected by switching at the data bus switch circuit 14. This causes the data on the data bus 203 or 204 selected by the data bus switch circuit to be sent to the external memory 18 via the shared data bus 206.

The address bus switch circuit 14 and the data bus switch circuit 15 makes switching selection according to the bus switch signals 103a and 103b output from the bus mediation circuit 13 synchronizing with the system clock 101.

The bus mediation circuit 13 divides the system clock 101 by two clocks to output the switch control signals 103a and 103b so as to switch the bus occupancy right for the shared address buses 205 and 206 between CPU 11 and the CPU 12 for every two clocks in the basic operation status as shown in FIG. 2. Specifically, by allowing the CPU 12 (states T2 to T3 of a bus cycle) to occupy the shared buses and to access the external memory 18 while the CPU 11 is in states T4 to T1 without any access to the shared buses, execution operation at the CPU 12 is enabled without stopping execution operation at the CPU 11 and without any contention for the shared buses. The operation clock 105 of the CPU 11 in FIG. 2 is exactly the same as the system clock 101 when the clock modulator 17 does not execute any modulation.

In this embodiment, the CPU 11 and the CPU 12 do not conduct fetching and execution for each instruction in order for improved processing speeds. They prefetch instructions in advance so that it can execute the following instruction continuously upon completion of an instruction execution at the instruction execution unit EXU in the CPU. Instruction codes are fetched at the same timing as data reading. If a certain instruction requires long internal processing time for execution, after the execution of that instruction is started by fetching of instruction codes from the instruction code buffer with the instruction execution unit EXU, the bus control unit BCU in the CPU continues prefetching for the instruction code buffer until the instruction code buffer becomes full.

If, even when the instruction code buffer becomes full, the instruction execution unit EXU is still executing the instruction and does not fetch any instruction code from the instruction buffer, then the bus control unit BCU stops prefetching of the following instruction code with automatically inserting an idle state Ti after state T3, which is the data fetch state. The idle state Ti is continuously inserted until the instruction execution unit EXU completes the instruction being executed and fetches the next instruction code from the instruction code buffer. Thereafter, the bus control unit BCU develops processing of states T4 and T1 in the bus cycle.

Though a case with prefetching of instructions is described above, the present invention is applicable to cases without instruction prefetching. When the system does not prefetch instructions, if the CPU is still executing the previous instruction and does not fetch the next instruction in state T3 of the bus cycle, the idle state Ti is inserted next to state T3 until the instruction execution unit EXU completes the instruction being executed and fetches the next instruction.

For this, the processor state detector 16 synchronizes the state of the CPU 11 with the clock 105 so as to detect the bus status signal 104 of the CPU 11. If, by insertion of idle state Ti to the bus cycle of the CPU 11, the processor state detector 16 detects any of states T1, T4 and idle state Ti at the timing when the CPU 11 occupies the shared buses 205 and 206, then the clock modulator 17 delays the predetermined states for the predetermined number of clocks according to the detected state. Thus, the system is controlled so that the bus cycle always has states T2 and T3 at the timing where the CPU 11 occupies the shared buses from the next time.

According to the present invention, with considering idle state Ti inserted for the above reason, the shared bus is controlled so that the state is always T2 or T3 for the CPU 11 when the CPU 11 has the bus occupancy right as shown in the basic timing chart of FIG. 2.

The bus mediation circuit 13 divides the system clock 101 by two clocks to output the state sampling signal 102 to the processor state detector 16. The processor state detector 16 receives, with synchronizing with the state sampling signal 102, the bus status signal 104 input form the CPU 11 so as to detect the bus cycle state at the CPU 11. If one of states T1, T4 and Ti is detected, the system drives the clock modulator 17 of the CPU 11 to modulate the clock 105 for the CPU 11 and delays the predetermined states for the predetermined number of clocks according to the detected state.

Thus, in spite of change in the operation clock 105 at the CPU 11, the address bus switch circuit 14 and the data bus switch circuit 15 are switched for every two clocks by the bus mediation circuit 13 and the CPU 12 can periodically access the external memory 18 using the shared address buses 205 and 206 for the period when the CPU 11 does not access the external memory 18 (when the shared address buses 205 and 206 are not occupied).

Figure 3:
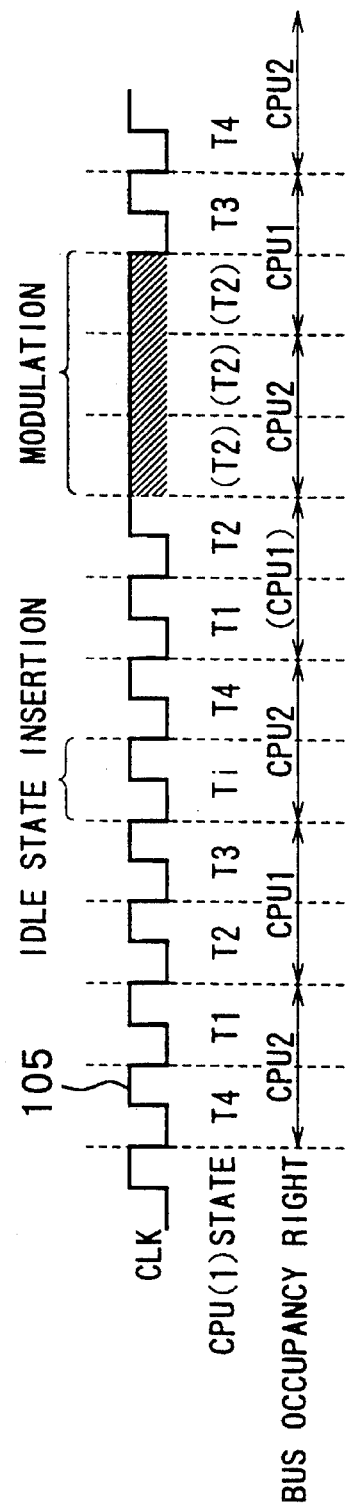
FIG. 3 is a timing chart of the operation when one idle state is inserted to the bus cycle.

FIGS. 3 to 5 show the timing charts when the idle state Ti is inserted to the bus cycle of the CPU 11. The processor state detector 16 decodes the bus status signal 104 of the CPU 11 synchronizing with the state sampling signal 102 to determine the state of the CPU 11. If state T2 or T4 is not detected at the timing when the CPU 11 occupies the shared buses, it is judged that the idle state Ti is inserted to the bus cycle of the CPU 11 and the clock is modulated for the CPU 11 according to the content of the detected state.

FIGS. 3 to 5 show three cases where one or more idle state Ti is inserted to the bus cycle of the CPU 11. In the first case, as shown in FIG. 3, one idle state Ti is inserted to the bus cycle of the CPU 11. In the second case, as shown in FIG. 4, two idle states are inserted to the bus cycle of the CPU 11. In the third case, as shown in FIG. 5, three idle states are inserted to the bus cycle of the CPU 11.

In the case of FIG. 3, insertion of one idle state Ti shifts the operation timing of the CPU 11 by one state. Accordingly, when the processor state detector 16 samples the bus status signal 104 for every two clocks, it detects state T1 at the timing where the shared buses are occupied by the CPU 11. This causes the processor state detector 16 to judge that one idle state Ti is inserted and drives the clock modulator 17 so that the clock 105 is modulated with delaying state T2 following the detected state T1 for three clocks.

As a result, during the delay of three clocks, the system allows the CPU 12 to occupy the shared buses 205 and 206 and enables access by the CPU 11 in states T2 and T3 when the CPU 11 occupies the shared buses next time while the CPU 12 stops occupation of the buses.

In the case of FIG. 4, insertion of two idle states Ti shifts the operation timing of the CPU 11 by two states. Accordingly, when the processor state detector 16 samples the bus status signal 104 for every two clocks, it detects state T4 at the timing where the shared buses are occupied by the CPU 11. This causes the processor state detector 16 to judge that two idle states Ti are inserted and drives the clock modulator 17 so that the clock 105 is modulated with delaying state T1 following the detected state T4 for two clocks.

As a result, during the delay of two clocks, the system allows the CPU 12 to occupy the shared buses 205 and 206 and enables access by the CPU 11 in states T2 and T3 when the CPU 11 occupies the shared buses next time while the CPU 12 stops occupation of the buses.

In the case of FIG. 5, insertion of three idle states Ti shifts the operation timing of the CPU 11 by three states. Accordingly, when the processor state detector 16 samples the bus status signal 104 for every two clocks, it detects state Ti at the timing where the shared buses are occupied by the CPU 11. This causes the processor state detector 16 to judge that three idle states Ti are inserted and drives the clock modulator 17 so that the clock 105 is modulated with delaying state T1 following the detected state Ti for one clock.

As a result, during the delay of one clock, the system allows the CPU 12 to occupy the shared buses 205 and 206 and enables access by the CPU 11 in states T2 and T3 when the CPU 11 occupies the shared buses next time while the CPU 12 stops occupation of the buses.

As shown above, if insertion of one idle state Ti into the bus cycle of the CPU 11 shifts the operation timing of the CPU 11, then the above control enables continuous accessing with keeping access to the shared buses by the CPU 12.

In this embodiment, if four idle states Ti are inserted, state T2 is detected at the timing when the CPU 11 occupies the shared buses next time, and the clock is not modulated. The system operates according to the basic timing of FIG. 2. This is the case when the number of inserted idle states is other multiples of four.

When five or more idle states Ti are inserted, the system is controlled in the same way as one to three idle state insertion as described above.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A shared bus control system for multiprocessor system having shared buses for a plurality of processors comprising:

bus mediation means for outputting a switch control signal to switch with a regular cycle an occupation of said shared buses by said plurality of processors synchronizing with a predetermined system clock;

bus selection means for receiving addresses and data from said plurality of processors and selecting the address and data output from one processor to output them to said shared buses according to the switch control signal from said bus mediation means;

state detection means for receiving bus status signal output from a particular processor among said plurality of processors and detecting whether a bus state of said particular processor is the bus state for accessing said shared buses at a timing where said shared buses are occupied by said particular processor, and outputting a detection signal indicating the detected bus state; and clock modulation means for shifting the bus state of said particular processor by modulating an operation clock for said particular processor so that the bus state of said particular processor becomes the bus state for accessing said shared buses at the timing where said shared buses are occupied by said particular processor according to the detection signal output from said state detection means.

2. A shared bus control system as set forth in claim 1, wherein said state detection means detects shifting of a bus cycle timing at said particular processor according to the bus status signal from said particular processor and said clock modulation means corrects the bus cycle timing by modulating the operation clock of said particular processor.

3. A shared bus control system as set forth in claim 1, wherein said state detection means receives the switch control signal output from said bus mediation means as a signal and receives said bus status signal synchronizing with the sampling signal to detect the bus state of said particular processor.

4. A shared bus control system as set forth in claim 1, wherein said shared buses comprise a shared address bus and a shared data bus, and said bus selection means comprises:

(i) address bus selection means for receiving addresses output from plurality of processors, selecting the address from one processor of said plurality of processors according to the switch control signal from said bus mediation means and outputting the address to the shared address bus, and (ii) data bus selection means for receiving data output from the plurality of processors, selecting the data output from one processor of the plurality of processors according to the switch control signal from said bus mediation means and outputting the data output it to the shared data bus.

5. A shared bus control system as set forth in claim 1, wherein said plurality of processors access said shared buses with a bus cycle comprising four states (four clocks) including state T1 for start of bus cycle, state T2 for address determination, state T3 for data fetching and state T4 for bus cycle completion, and said bus mediation means outputs the switch control signal to said bus selection means for every two clocks so that said particular processor occupies said shared buses when the state of said one processor is state T2 for address determination or state T3 for data fetching.

6. A shared bus control system as set forth in claim 5, wherein said state detection means receives the switch control signal output from said bus mediation means as a sampling signal and receives said bus status signal and synchronizes with said sampling signal so as to detect the bus state of said particular processor.

7. A shared bus control system as set forth in claim 5 wherein, when insertion of an idle state Ti into the bus cycle of said particular processor results in detection of state T1, T4 or idle state Ti by said state detection means at the timing where said shared buses are occupied by said particular processor, said clock modulation means enables access to said shared buses by said particular processor at the time when the occupation of the shared buses by said other processor is released next time by delaying the clock corresponding to the state following said detected state of said particular processor for a predetermined number of clocks.

8. A shared bus control system for a multiprocessor system having shared buses for a plurality of processors comprising:

bus mediation means for outputting switch control signals to switch with a regular cycle accessing said shared buses among said plurality of processors synchronizing with a predetermined system clock;

bus selection means for receiving addresses and data from said plurality of processors and selecting the address and data output from one processor of the plurality of processors to output the address and data output to said shared buses according to the switch control signals from said bus mediation means;

state detection means for receiving a bus status signal output from a particular processor among said processors and detecting whether a bus state of said particular processor is the bus state for accessing said shared buses at a timing where said shared buses are occupied by said particular processor, and outputting a detection signal indicating the detected bus state;

clock modulation means for shifting the bus state of said particular processor by modulating an operation clock for said particular processor so that the bus state of said particular processor becomes the bus state for accessing said shared buses at the timing where said shared buses are occupied by said particular processor according to the detection signal output from said state detection means;

wherein said plurality of processors access said shared buses with a bus cycle comprising four states corresponding to four clocks including a state T1 for start of bus cycle, a state T2 for address determination, a state T3 for data fetching and a state T4 for bus cycle completion, said bus mediation means outputs the switch control signal to said bus selection means for every two clocks so that said particular processor occupies said shared buses when the state of said one processor is at the state T2 for address determination or at the state T3 for data fetching, and when insertion of an idle state Ti into the bus cycle of said particular processor results in detection of the state T1, T4 or idle state Ti by said state detection means at the timing where said shared buses are occupied by said particular processor, said clock modulation means enables access to said shared buses by said particular processor at the time when the occupation of the shared buses by said other processor is released next time by delaying the clock corresponding to the state following said detected state of said particular processor for a predetermined number of clocks.

\* \* \* \* \*